Nov. 3, 1953        F. S. ELSAESSER        2,657,423
MACHINE FOR MAKING HAMBURG STEAK PATTIES
Filed July 17, 1947                                  3 Sheets-Sheet 1
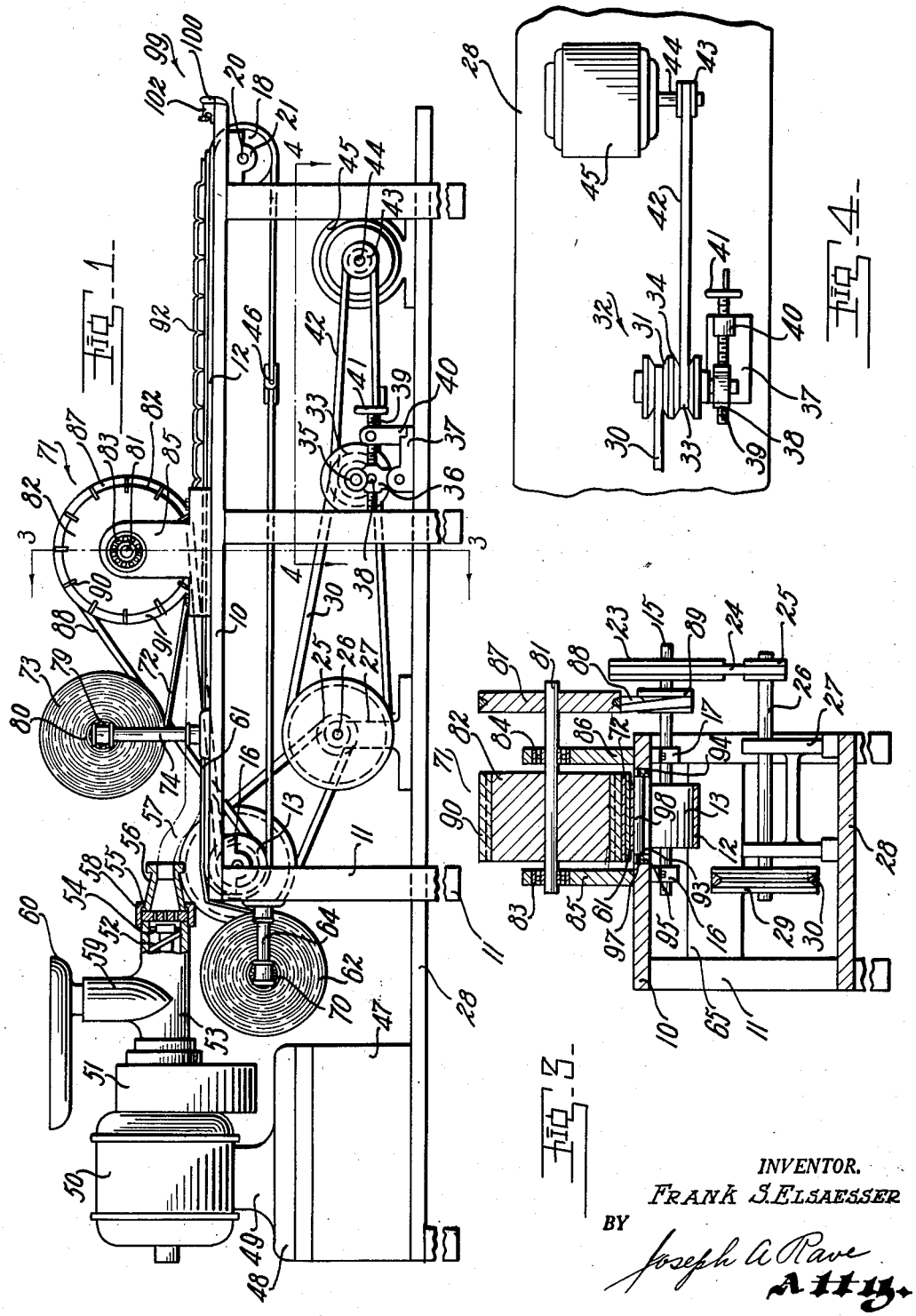
INVENTOR.
FRANK S. ELSAESSER
BY
Joseph A. Pave
Atty.

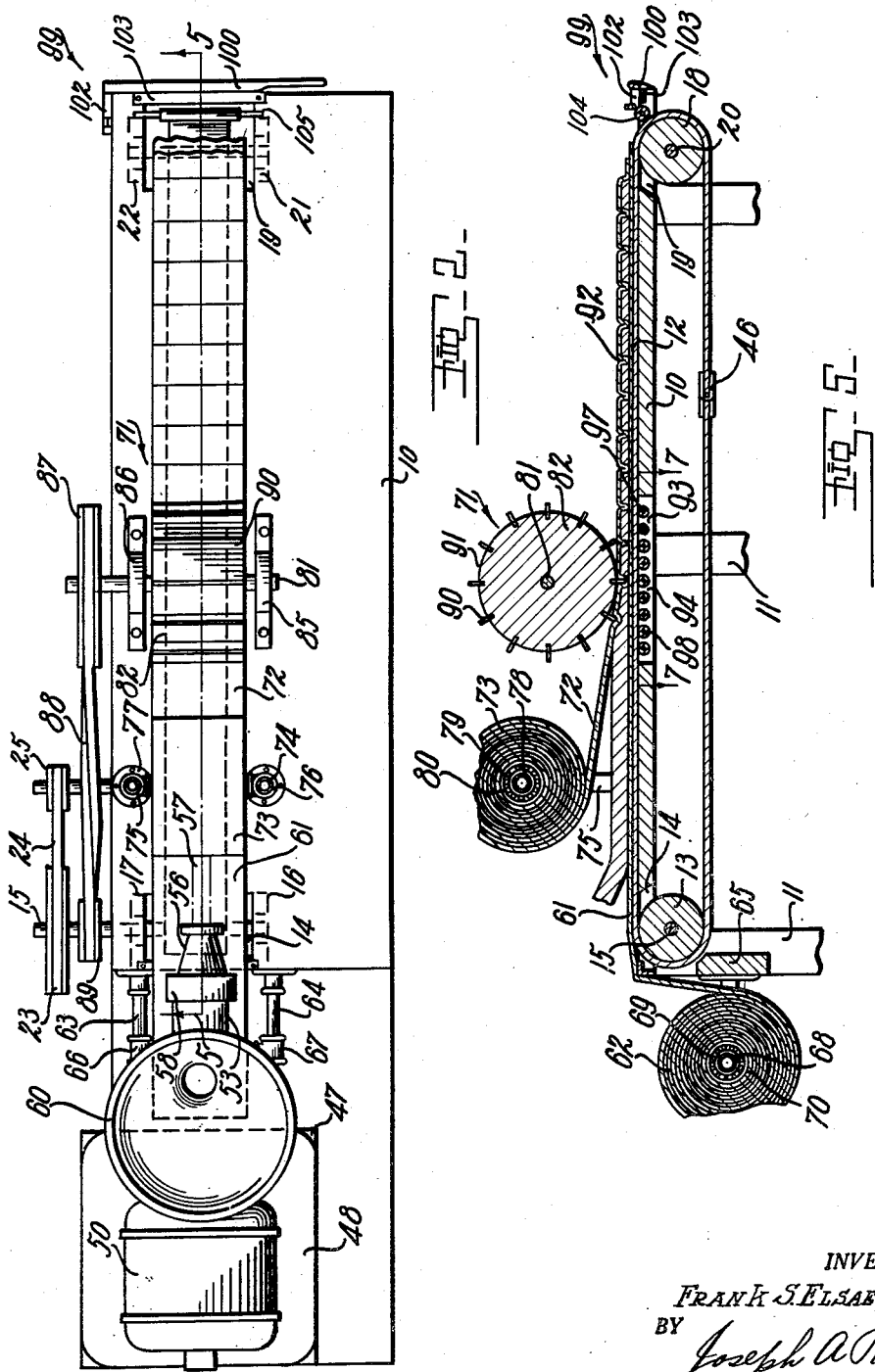

Nov. 3, 1953 F. S. ELSAESSER 2,657,423
MACHINE FOR MAKING HAMBURG STEAK PATTIES
Filed July 17, 1947 3 Sheets-Sheet 3
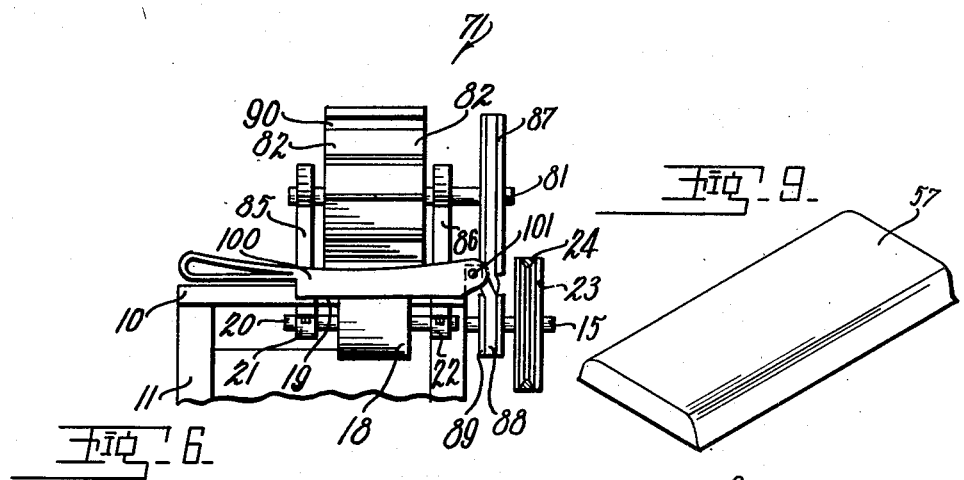
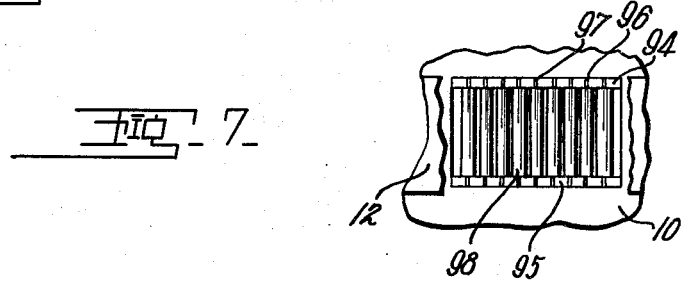
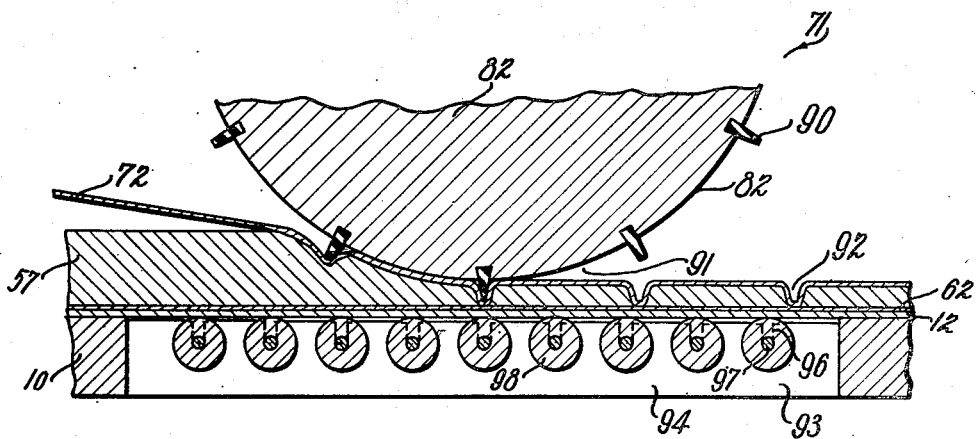
INVENTOR.
Frank S. Elsaesser
BY
Joseph A. Rave
Atty.

Patented Nov. 3, 1953

2,657,423

UNITED STATES PATENT OFFICE 2,657,423

MACHINE FOR MAKING HAMBURG STEAK PATTIES

Frank S. Elsaesser, Cincinnati, Ohio

Application July 17, 1947, Serial No. 761,504

4 Claims. (Cl. 17—32)

This invention relates to improvements in a machine for forming Hamburg steak patties.

The principal object of the present invention is the provision of a machine for simultaneously dividing and mashing or flattening a stream of ground meat into patties which are to be subsequently cooked as Hamburg steaks.

Another object of this invention is the provision of a machine for forming or providing Hamburg steak patties that are of greater length than width as distinguished from the usual round Hamburg steaks whereby the long buns as usually employed with sausages or "hot dogs" may be employed in providing a Hamburg steak sandwich.

Another object of this invention is the provision of a machine for accomplishing the foregoing objects and which Hamburg steak patties are provided with a covering paper above and below each patty.

Another object of the present invention is the provision of a machine for accomplishing the above objects which is substantially automatic in its operation requiring an attendant to merely continuously feed the meat grinder so that a continuous stream of ground meat is supplied to the machine so that the Hamburg steak patties of desired size and weight may be automatically produced.

It is also an object of this invention to provide a machine wherein the stream of Hamburg steak patties, after being formed, may be separated from one another individually or in groups of two or more for being accordingly placed on a grill for frying or the like.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a front elevational view of a machine embodying the improvements of the present invention.

Fig. 2 is a top plan view of the machine illustrated in Fig. 1.

Fig. 3 is a vertical cross sectional view through the machine as seen from line 3—3 on Fig. 1.

Fig. 4 is a fragmentary plan view of a portion of the machine particularly the driving mechanism as seen from line 4—4 on Fig. 1.

Fig. 5 is a fragmentary longitudinal sectional view through the machine as seen from line 5—5 on Fig. 2.

Fig. 6 is a fragmentary end elevation of the machine as seen from the right hand end of Fig. 1.

Fig. 7 is a fragmentary plan view of a part of the supporting table as seen from line 7—7 on Fig. 5.

Fig. 8 is an enlarged fragmentary sectional view through the dividing and mashing throat and forming a detail of the invention.

Fig. 9 is a perspective view of a Hamburg steak patty as produced by this machine.

Throughout the several views of the drawings similar reference characters are employed to denote the same or similar parts.

A machine embodying the principles of the present invention may take any suitable or desirable form such for example as illustrated in the drawings.

The machine illustrated in the drawings comprises a supporting table 10 supported by a plurality of uprights or legs 11. Mounted on the table 10 for movement therealong is an endless conveyor belt 12 extending about a driving drum 13 at one end of the table 10. In practice the drum 13 is disposed in a recess 14 in the table and is so mounted that the upper surface of the table 10 is tangent to the drum. In order to so mount the driving drum 13 it is keyed or otherwise secured to a shaft 15 journaled suitable bearings 16 and 17 secured to the under surface of the table and depending therefrom.

The conveyor belt 12, in addition, extends about an idler drum or pulley 18 disposed in a recess 19 at the other end of the table 10. The drum 18, similar to the drum 13, has the upper surface of the table 10 tangent thereto. In order to mount the idler drum 18 it is keyed or otherwise secured to a shaft 20 which is journaled in suitable bearings 21 and 22 depending from the under surface of the table 10.

In order to drive the drum 13, and thereby the transmission belt 12, the shaft 15 extends rearwardly of the machine and has keyed or otherwise secured thereto a pulley 23 about which is trained a belt 24. The belt 24 in addition is trained about a pulley 25 on one end of an intermediate or countershaft 26 rotatably supported by a bracket 27. The bracket 27 is secured to and upstands from a shelf 28 carried by the legs 11 in a plane below the main supporting table 10. The intermediate or countershaft 26 has keyed or otherwise secured to its other end a pulley 29 about which is trained a belt 30 that in turn extends about a pulley 31 of a speed variator, indicated in general by the reference numeral 32.

The speed variator 32 may take any suitable or desirable form, that shown in the drawings being one such form and forms no part of the present invention except in combination. Specifically, the speed variator 32 includes a second pulley 33 the diameter of which is variable, as is the diameter of the pulley 31, with said pulley diameters being conversely adjustable. In order to effect the variation in the effective diameters of pulleys 31 and 33 the adjacent side thereof is formed by a common member 34 which is movable toward and from the fixed sides of pulleys 31 and 33. In order to effect this variation in pulley sizes the said pulleys are mounted on a shaft 35 carried by an arm 36 oscillatably mounted in base 37 of the speed variator 32. To effect the actual oscillation of the arm 32 it has swivelly mounted therein a nut 38 with which is screw connected an adjusting screw 39. The screw 39 is journaled against axial movement in an upright or post 40 from the base 37 and the screw 39 carries at its outer end a hand wheel 41 whereby said screw 39 may be rotated in effecting the adjusting of the speed variator.

Entrained about the pulley 33 is a belt 42 which is in turn entrained about pulley 43 on shaft 44 of motor 45. It will be understood that oscillation of the shaft 35 will tend to tighten one belt 30 or 42 and thereby automatically loosen the other and thereby automatically obtain pulley diameter variations.

From the foregoing it is now evident that the conveyor belt 12 is constantly driven and in order that the belt may be removed for periodic and necessary renovating it is provided with the usual separable connection 46 whereby its ends may be joined to provide an endless belt.

The driving mechanism supporting shelf 28 is shown as extending beyond one end of the main supporting table 10 to support the meat grinder which comprises a supporting block 47 to which is secured the base 48 of the meat grinder. Upstanding from the base 48 is a pedestal 49 having secured thereto or integral therewith a motor 50. The motor 50 through suitable gears within gear reduction housing 51 drives a feed screw 52 within the body 53 of the meat grinder. Secured to the feed screw 52, at its forward end, is a cutter 54 which cooperates with an extrusion plate 55 in dividing or grinding the meat to the desired comminuted form. Forwardly of the extrusion plate 55 is a nozzle 56 through which the ground meat 57 is extruded. The nozzle 56 and extrusion plate 55 are secured to the grinder body 53 by a suitable shouldered nut 58. A feed neck or funnel 59 extends from the grinder body 53 and supports a suitable tray or the like 60 which normally holds the meat to be ground and from which tray the meat is fed to the grinder body.

The nozzle 56, as will later be made clear, has an opening of such capacity that the meat 57 when severed into individual portions and flattened out gives the proper quantity for forming a Hamburg steak patty. As will be seen from Fig. 2 the discharge nozzle 56 overlies the conveyor belt 12 substantially midway of its sides and at a point just above the driving drum 13. The ground meat 57, however, not discharged directly onto the conveyor belt but instead onto a paper layer 61 which overlies the belt 12 and moves therewith. The paper layer 61 is unreeled, as from a roll 62 carried by the forward end of the machine. Any suitable or desirable means may be provided for supporting the paper roll 62, such as that illustrated in the drawings, which comprises arms 63 and 64 having their inner ends secured to a transverse member 65 carried by the legs 11 of the table 10. The arms 63 and 64 each at its other end provides a bearing 66 and 67 for a shaft 68 on which are mounted anti-friction or ball bearings 69 received in the hollow core 70 of the roll 62.

The weight of the ground meat 57 is such as to supply sufficient pressure on the paper layer 61 that the said ground meat, paper layer 61 and conveyor belt 12 move as a unit to the meat dividing and mashing of flattening mechanism indicated in general by the reference numeral 71. Prior, however to the ground meat 57 reaching the dividing and mashing or flattening unit 71 the said ground meat is covered by a covering paper layer 72 which is unreeled, as needed, from a second paper roll 73.

Any suitable or desirable means for supporting the paper roll 73 may be provided such for example as illustrated in the drawings. The means for mounting the paper roll 73 comprises a pair of uprights or standards 74 and 75 secured to and upstanding from the supporting table 10 and respectively located on opposite sides of the conveyor belt 12. Each of the uprights or standards 74 and 75 is provided with a bearing member 76 and 77 in which is journaled a shaft 78 that supports anti-friction or ball bearings 79 received in the hollow core 80 of the paper roll 73.

The dividing and mashing or flattening unit 71 comprises a shaft or axle 81 to which is secured a flattening or mashing drum 82; the shaft 81 projects beyond the sides of the drum 82 to be received in anti-friction or ball bearings 83 and 84 respectively carried by supports or bearing members 85 and 86 secured to and upstanding from the table 10. The mashing or flattening drum 82 is adapted to be power driven for which purpose it has keyed or otherwise secured to a projecting portion of its shaft 81 a pulley 87 about which is trained a belt 88. The belt 88 is in turn trained about a second pulley 89 keyed or otherwise secured to the drum shaft 15 wherefor said conveyor belt drum 13 and the conveyor belt 12 are simultaneously driven with the masher or flattener drum 82. It should be noted that the masher or flattener drum 82 is to be rotated to have its periphery travel in the same direction as the direction of travel of the conveyor belt 12 wherefor the belt 88 is twisted between the pulleys 89 and 87. It should further be noted that the peripheral speed of the masher or flattening drum 82 must be substantially equal to the peripheral speed or rate of travel of the conveyor belt 12.

In order to divide the stream of ground meat 57 into amounts or portions to produce Hamburg steaks, the drum 82 has projecting from its periphery a plurality of divider blades 90. The divider blades 90 project outwardly, or radially of the masher or flattening drum periphery a distance substantially equal to the thickness of the patty and the subsequently formed Hamburg steak, and at the same time the said blades 90 are spaced from one another around the periphery of the drum 82 to form pockets 91 that determine the ultimate or final shape and size of the patties. In other words the dividing and mashing or flattening unit 71 is so designed and mounted with respect to the table 10 and its conveyor belt 12 that each packet 91 forms a Hamburg steak patty of the desired size and shape.

In practice the stream of ground meat 57 is considerably thicker than a Hamburg steak patty so that the quantity of meat, so far as the thickness is concerned, initially disposed in a pocket 91, is considerably thicker than desired although the quantity of meat is the desired quantity. As the pockets 91 continue to move after initially being charged with meat the said meat is compressed within the pocket which in effect causes the meat to be forced laterally of the machine thereby producing a Hamburg steak patty having a comparatively small width and great length such for example as illustrated in Fig. 9.

The dividing blades 90 may and preferably do have the cross section illustrated in Fig. 8 which is substantially wedge shape and the said blades 90 are preferably formed of hard rubber which while having sufficient strength and rigidity to accomplish the desired function will not damage the conveyor belt 12 since it operates directly against this belt in forming the patties. By this construction the division between adjacent patties takes the form illustrated at 92 in Fig. 8 wherein a substantially wide upper end is provided to accommodate the patty encasing paper cutting or dividing mechanism, to be presently described.

To assist in the mashing or flattening and the dividing of the meat 57 there is provided immediately below the dividing and mashing or flattening mechanism 71 an anti-friction support for the belt 12. This anti-friction support comprises forming in the table 10 a recess 93 and securing in said recess at opposite sides thereof bearing members 94 and 95 each having formed therein aligned slots 96 receiving projecting journals of shafts 97 to each of which shafts 97 is secured an anti-friction roller 98. By this construction the flat top of the table 10 with its attendant friction resistance to the movement is materially facilitated.

Carried by the table 10 at its rear end is a paper cutting mechanism indicated in general by the reference numeral 99. The cutting mechanism 99 compirses an oscillable knife or blade 100 pivotly mounted at 101 to a bracket 102 secured to and carried by the table 10. In addition the table 10 has secured to its end, and spanning the recess 19 therein, a fixed blade 103 and relative to which the movable blade 100 operates.

The operation of this paper cut off mechanism is believed obvious since upon a patty division recess 92 in the ground meat stream 59 reaching rear end of the table 10 the knife blade is actuated therethrough and since the divider blades 90 separate the ground meat the said knife blade 100 severs the paper layers 61 and 72 between adjacent ground meat patties.

It has been found that the actuation of the knife blade 100 has a tendency to slow up the movement of the ground meat and since it is beyond the conveyor belt 12 use is made of an anti-friction supporting roller 104 which spans the recess 19 in the table end and has its projecting pins 105 journaled in suitable recesses formed in the table.

From the foregoing it will now be appreciated that there has been provided a Hamburg steak patty forming machine that accomplishes the objects initially set forth.

What is claimed is:

1. In a device of the class described the combination of a supporting table, a constantly moving supporting and transporting belt on said table receiving and transporting a relatively thick stream of ground meat, a rotatable drum above said table beneath which the stream of ground meat is moved, a flexible cover associated with said ground meat stream to be between said ground meat stream and said drum while the said ground meat stream is passing beneath the drum, a plurality of blades circumferentially spaced axially extending from the periphery of the drum with each blade extending transversely of the drum for substantially the full width thereof, said stream of ground meat being of greater thickness than the axial extent of the blades from the drum and severed into portions by said blades and each ground meat portion sufficient to form a Hamburg steak patty but each portion requiring spreading out and flattening into said patty, said drum blades axially extending from the periphery of the drum an amount equal to the desired patty thickness and spaced from one another a distance less than the width of the drum and forming on the drum periphery adjacent pockets whose long sides are formed by the drum blades, and means associated with the drum for mounting the drum above the supporting table and supporting and transporting belt a distance substantially equal to the axial extent of the blades therefrom so that each ground meat portion within its pocket is flattened into a Hamburg steak patty substantially conforming to the dimensions of its pocket and said flexible cover is forced between the adjacent steak patties by said blades.

2. In a device of the class described the combination of a supporting table, a constantly moving supporting and transporting belt on said table receiving and transporting a relatively thick stream of ground meat, means connected with said supporting and transporting belt for effecting its movement, a paper roll rotatably supported by said table for supplying a flexible paper cover for said stream of ground meat, a rotatable drum above said table beneath which the stream of ground meat is moved, a plurality of blades circumferentially spaced axially extending from the periphery of the drum with each blade extending transversely of the drum for substantially the full width thereof, said stream of ground meat being of greater thickness than the axial extent of the blades from the drum and severed into portions as it passes beneath the drum, said drum blades each axially extending from the periphery of the drum an amount equal to the desired patty thickness and spaced from one another a distance less than the width of the drum forming on the drum periphery adjacent pockets whose long sides are formed by the drum blades, and means associated with the drum for mounting the drum above the supporting table and supporting and transporting belt a distance substantially equal to the axial extent of the blades therefrom so that each ground meat portion within its pocket is flattened into a Hamburg steak patty substantially conforming to the dimensions of its pocket and said ground meat flexible paper cover is forced between adjacent Hamburg steak patties by the said blades.

3. In a device of the class described the combination of a supporting table, a constantly moving supporting and transporting belt on said table receiving and transporting a relatively thick stream of ground meat, means connected with said supporting and transporting belt for effecting its movement, a paper roll rotatably supported by said table adjacent one end thereof for supplying a paper cover for said supporting and transporting belt, said supporting and transporting belt paper cover receiving a relatively thick stream of ground meat, a second roll of paper rotatably supported by the table above the ground meat stream for supplying a flexible covering paper for said ground meat stream, a rotatable drum above said table beneath which the stream of ground meat is moved, a plurality of blades circumferentially spaced axially extending from the periphery of the drum with each blade extending transversely of the drum for the full width thereof, said stream of ground meat being of greater thickness than the axial extent of the blades and movable with its flexible covering paper and supporting and transporting belt with its covering paper beneath the drum, the said drum blades axially extending from the periphery of the drum an amount equal to the desired patty thickness and spaced from one another a distance less than the width of the drum forming on the drum periphery adjacent pockets whose long sides are formed by the drum blades, and means associated with the drum for mounting the drum above the supporting table and supporting and transporting belt and its covering paper a distance substantially equal to the distance the blades axially extend therefrom so that each ground meat portion within its pocket is flattened into a Hamburg steak patty substantially conforming to the dimensions of its pocket and said ground meat flexible paper cover is forced between adjacent Hamburg steak patties by the said blades.

4. As an article of manufacture for use with a Hamburg steak patty forming machine, a cylindrical drum, a plurality of blades circumferentially spaced axially extending from the periphery of the drum with each blade extending transversely of the drum for substantially the full width thereof, said blades being spaced from one another an amount appreciably less than the width of the drum and each blade axially extending from the periphery of the drum substantially the same distance and which distance is appreciably less than the circumferential spacing of said blades so that successive peripherial pockets around the drum are provided with each pocket substantially the full width of the drum and of appreciably greater length than width and appreciably less depth than width and with each pocket adapted to receive a quantity of ground meat for spreading out and flattening into a Hamburg steak patty of greater length than width and less thickness than width.

FRANK S. ELSAESSER.

References Cited in the file of this patent

UNITED STATES PATENTS

| Number | Name | Date |
|---|---|---|
| 1,409,998 | Cooley | Mar. 21, 1922 |
| 1,831,779 | MacDonald | Nov. 10, 1931 |
| 1,963,718 | Schatz | June 19, 1934 |
| 2,299,314 | Elesh et al. | Oct. 20, 1942 |
| 2,386,775 | Balzarini | Oct. 16, 1945 |
| 2,397,446 | Tansley | Mar. 26, 1946 |